(12) United States Patent
Cho et al.

(10) Patent No.: US 11,841,064 B2
(45) Date of Patent: Dec. 12, 2023

(54) AIR DAMPER

(71) Applicant: PIOLAX, INC., Kanagawa (JP)

(72) Inventors: Jung Hyung Cho, Incheon (KR);
Nobuhiro Tamai, Incheon (KR)

(73) Assignee: PIOLAX, INC., Kanagawa (JP)

( * ) Notice: Subject to any disclaimer, the term of this patent is extended or adjusted under 35 U.S.C. 154(b) by 126 days.

(21) Appl. No.: 17/612,396

(22) PCT Filed: Jun. 12, 2020

(86) PCT No.: PCT/JP2020/023230
§ 371 (c)(1),
(2) Date: Nov. 18, 2021

(87) PCT Pub. No.: WO2020/255879
PCT Pub. Date: Dec. 24, 2020

(65) Prior Publication Data
US 2022/0221018 A1    Jul. 14, 2022

(30) Foreign Application Priority Data
Jun. 19, 2019    (KR) .......................... 10-2019-0072639

(51) Int. Cl.
*F16F 9/02*    (2006.01)
*F16F 9/32*    (2006.01)

(52) U.S. Cl.
CPC .......... *F16F 9/0218* (2013.01); *F16F 9/3214* (2013.01); *F16F 9/3242* (2013.01); *E05Y 2800/268* (2013.01); *F16F 9/0227* (2013.01)

(58) Field of Classification Search
CPC .................................................. F16F 9/0227
See application file for complete search history.

(56) References Cited

U.S. PATENT DOCUMENTS

2017/0009837 A1\*   1/2017   Saito ..................... F16F 9/3214
2022/0128113 A1\*   4/2022   Saito ........................ F16F 9/49

FOREIGN PATENT DOCUMENTS

| CN | 101675266 B | * | 6/2011 |
| DE | 20119207 U1 | * | 2/2002 |

(Continued)

OTHER PUBLICATIONS

Jul. 7, 2020, International Search Report issued for related PCT application No. PCT/JP2020/023230.

(Continued)

*Primary Examiner* — Melody M Burch
(74) *Attorney, Agent, or Firm* — Paratus Law Group, PLLC

(57) ABSTRACT

An air damper is provided. A piston member includes a stopper portion configured to come into contact with a cap in a state that a rod is pulled out to a maximum extent, and a deflection regulating portion configured to be positioned inside the engagement claw in the state to regulate an inward deflection of the engagement claw. An attachment portion rotatably attached to an attachment target portion is provided at an end portion of the rod. A contact surface is formed on the inner side of the engagement claw when viewed in an axial direction of the cylinder, the contact surface being capable of coming into contact with the deflection regulating portion when the rod swings in a direction of a rotation axis of the attachment portion with respect to the attachment target portion or in a direction intersecting the rotation axis.

4 Claims, 7 Drawing Sheets

(56) References Cited

FOREIGN PATENT DOCUMENTS

| GB | 2487229 A | * | 7/2012 |
| JP | 2006-283877 A | | 10/2006 |
| JP | 6402015 B2 | | 9/2014 |
| JP | 2016-011750 A | | 1/2016 |
| WO | WO-9425775 A1 | * | 11/1994 |
| WO | WO-2012073663 A1 | * | 6/2012 |
| WO | WO-2019039370 A1 | * | 2/2019 |

OTHER PUBLICATIONS

Jul. 7, 2020, International Search Opinion issued for related PCT application No. PCT/JP2020/023230.

* cited by examiner

AIR DAMPER

CROSS REFERENCE TO PRIOR APPLICATION

This application is a National Stage Patent Application of PCT International Patent Application No. PCT/JP2020/023230 (filed on Jun. 12, 2020) under 35 U.S.C. § 371, which claims priority to Korean Patent Application No. 10-2019-0072639 (filed on Jun. 19, 2019), which are all hereby incorporated by reference in their entirety.

TECHNICAL FIELD

The present invention relates to an air damper used for braking, for example, an opening and closing operation of a glove box of an automobile.

BACKGROUND ART

As a type of an air damper, the following Patent Literature 1 discloses an air damper. The air damper includes: a cylinder having a wall portion extending in a cylindrical shape, a closing portion being provided at one end of the wall portion, the other end side being open, and an engagement hole being formed in a peripheral wall on the other end opening side; a piston slidably inserted into the cylinder; a rod extending from the piston; a flow passage communicating an internal space surrounded by the closing portion of the cylinder and the piston to the outside; a braking force applying unit for narrowing the flow passage to apply a braking force to the piston when the piston slides in a direction away from or close to the closing portion of the cylinder, and widening the flow passage to release the braking force of the piston when the piston moves in a direction opposite the above direction; and a cap attached to an opening at the other end of the cylinder and having an opening portion from which the rod extends. The cap includes a base portion that covers the opening at the other end of the cylinder in a state where the rod extends from the opening portion, an insertion portion that is inserted into the cylinder, and a deflectable locking claw that engages with an engagement hole of the cylinder from an inner peripheral side of the cylinder. One of the piston and the rod is provided with a stopper portion that comes into contact with the cap to regulate further pull-out of the rod when the rod is pulled out to a maximum extent from the opening at the other end of the cylinder, and is provided with a deflection regulating portion that is positioned on a back side of the locking claw to regulate deflection of the locking claw toward the inside of the cylinder when the stopper portion comes into contact with the cap.

CITATION LIST

Patent Literature

Patent Literature 1: Japanese Patent No. 6402015

SUMMARY OF INVENTION

Technical Problem

In the air damper of Patent Literature 1, the locking claw engaging with the engagement hole of the cylinder of the cap is provided at a portion facing the peripheral wall of the cylinder so as to face a direction of a rotation axis when the end portion of the rod is rotatably attached to a glove box and the like, an inner side of the locking claw forms an inner surface perpendicular to the rotation axis, and a deflection regulating portion provided in one of the piston and the rod is disposed on an inner side thereof.

On the other hand, in an air damper attached to a glove box and the like of an automobile, when the glove box is detached for maintenance and the like, a rod may largely swing with respect to a cylinder in a state where the rod is pulled out to a maximum extent.

In such a case, when a swinging direction of the rod is a direction of the rotation axis, since the deflection regulating portion is disposed inside the locking claw, a retaining action of the locking claw acts, but in a case where the rod swings largely in a direction intersecting the direction of the rotation axis, there is a possibility that the deflection regulating portion is displaced with respect to the locking claw and the retaining action does not act.

Therefore, an object of the present invention is to provide an air damper which can sufficiently obtain a retaining effect of a locking claw of a cap attached to a cylinder.

Solution to Problem

In order to achieve the above object, an air damper of the present invention includes: a cylinder having one end closed and the other end opened; a piston member including a piston inserted into the cylinder and a rod connected to the piston and protruding from the opening; and a cap having an insertion hole for the rod and attached to the opening, in which a plurality of engagement holes are formed in an edge portion of the opening of the cylinder, the cap is formed with an engagement claw which is inserted into the opening and is fitted into the engagement hole from an inner side of the engagement hole, the piston member includes a stopper portion that comes into contact with the cap when the rod is pulled out to a maximum extent, and a deflection regulating portion that is positioned inside the engagement claw in a state of being pulled out to the maximum extent and regulates inward deflection of the engagement claw, an attachment portion that is rotatably attached to an attachment target portion is provided at an end portion of the rod that protrudes from the opening, and a contact surface is formed on the inner side of the engagement claw, the contact surface being capable of coming into contact with the deflection regulating portion even when the rod swings in a direction of a rotation axis of the attachment portion with respect to the attachment target portion or in a direction intersecting the rotation axis when viewed in an axial direction of the cylinder.

Advantageous Effects of Invention

According to the present invention, when the piston rod is pulled out to the maximum extent with respect to the cylinder, the stopper portion comes into contact with the cap, and further pulling out is regulated. In this state, even if the rod swings with respect to the cylinder in the direction of the rotation axis of the attachment portion or in the direction intersecting with the rotation axis, the deflection regulating portion formed in the piston or the rod comes into contact with the contact surface of the inner side of the engagement claw of the cap to regulate the deflection to the inner side, and therefore, the engagement claw can be prevented from coming off and the cap can be more reliably prevented from coming off.

DESCRIPTION OF EMBODIMENTS

Hereinafter, an embodiment of an air damper according to the present invention will be described with reference to the drawings.

Figure 1:
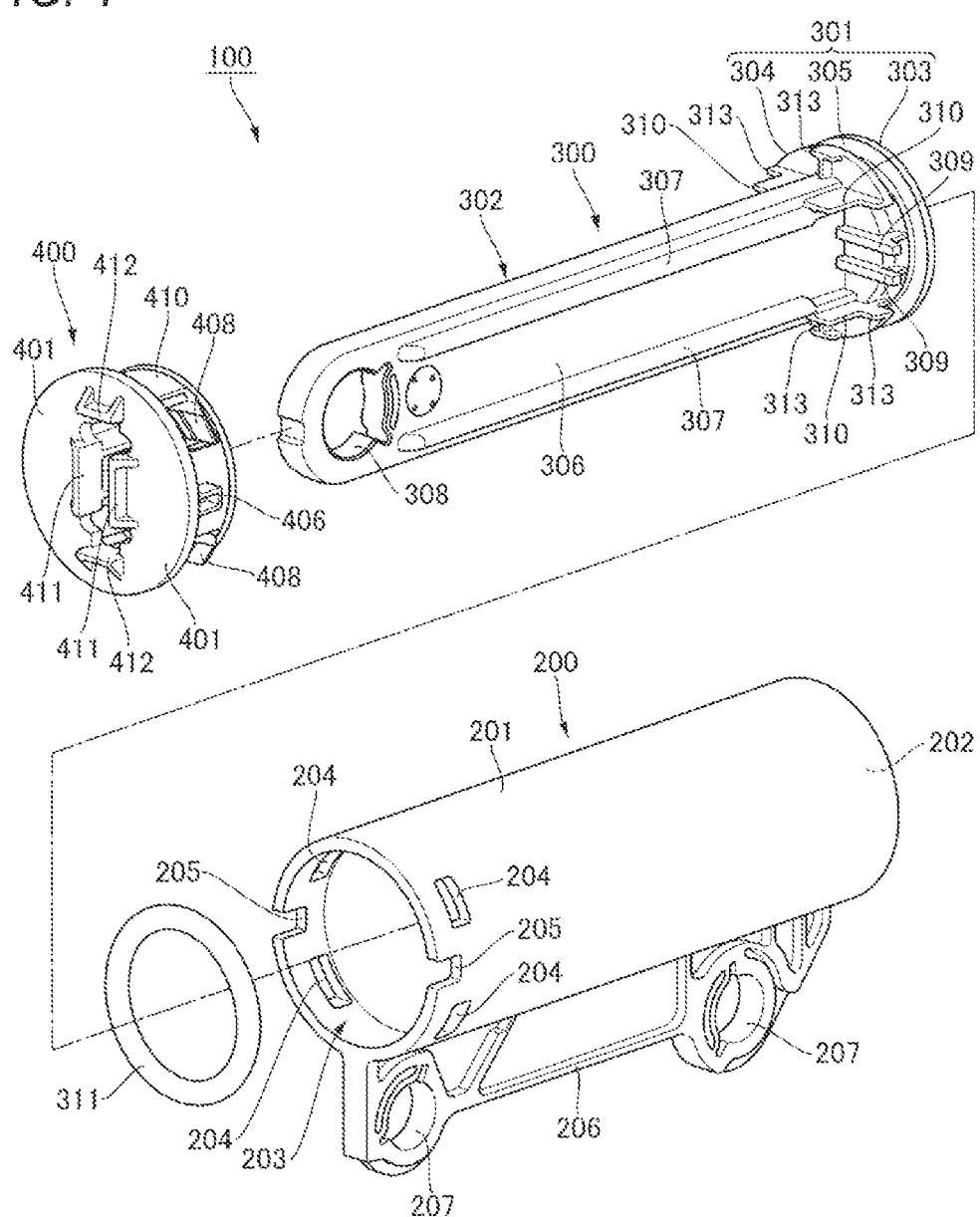
FIG. 1 is an exploded perspective view showing an air damper according to an embodiment of the present invention.
Figure 2:
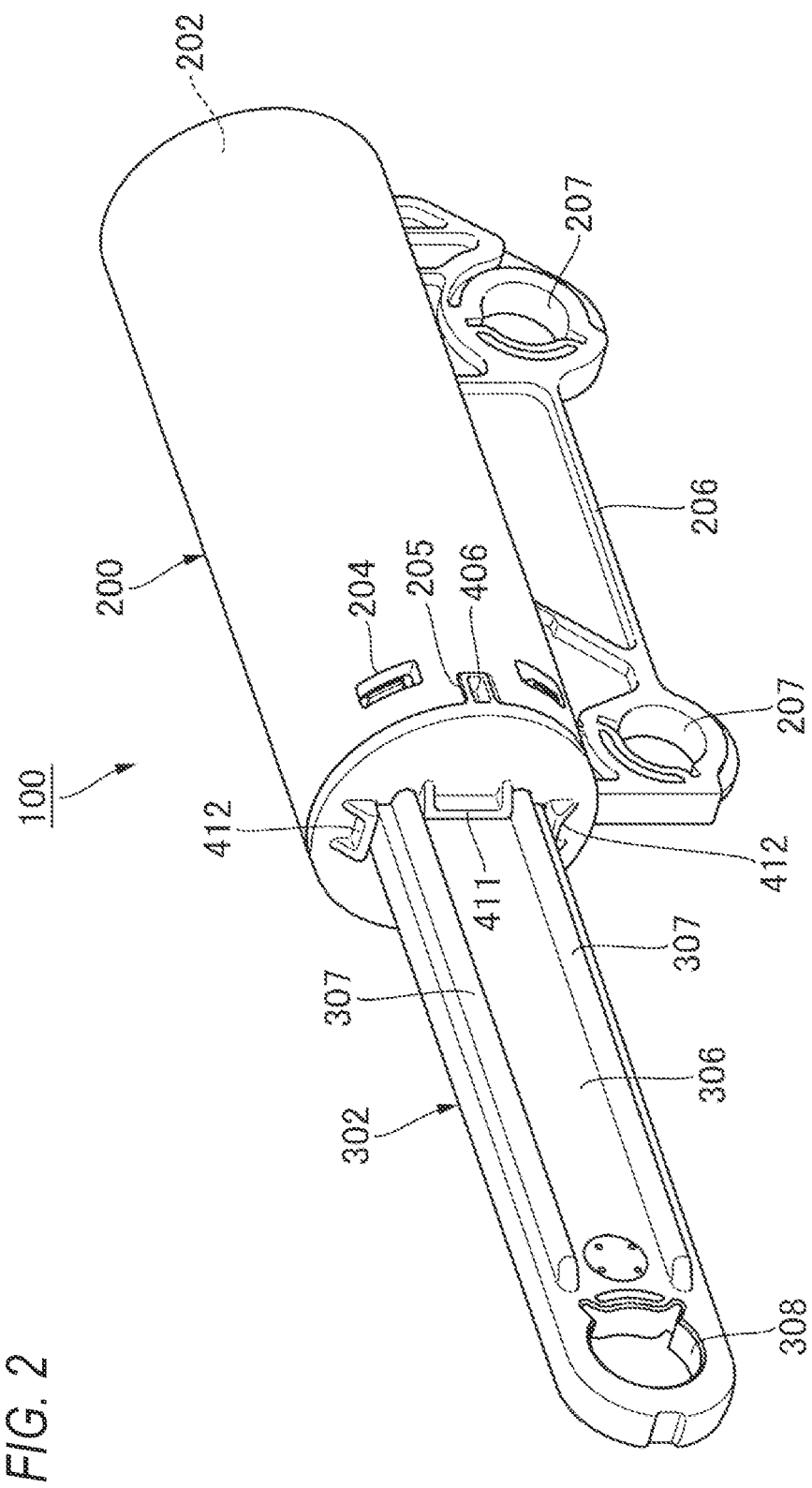
FIG. 2 is a perspective view of the air damper.

As shown in FIGS. 1 and 2, an air damper 100 includes a cylinder 200, a piston rod 300, and a cap 400.

One end of the cylinder 200 forms a closing end portion 202, and the other end of the cylinder 200 forms an opening end portion 203. A plurality of, in this embodiment, a total of four engagement holes 204 are formed at predetermined intervals along a peripheral direction in an opening edge portion of the opening end portion 203. Further, a pair of cutout portions 205 are formed at positions facing each other in a radial direction.

A plate-like bracket 206 extending along an axial direction is formed on an outer periphery of the cylinder 200, and attachment holes 207 are formed in both end portions of the bracket 206, respectively. The attachment hole 207 is used for attachment to one side of an opening and closing member such as a glove box.

The piston rod 300 includes a piston 301 that is inserted into the cylinder 200, and a rod 302 that is connected to the piston 301 and protrudes from the opening end portion 203 of the cylinder 200. The piston rod 300 constitutes a piston member in the present invention. The piston 301 includes a first flange 303 and a second flange 304, and an annular groove 305 is formed between the first flange 303 and the second flange 304. A seal ring 311 is attached to the annular groove 305, and a space between an inner periphery of the cylinder 200 and an outer periphery of the piston 301 is sealed by the seal ring 311.

Figure 3:
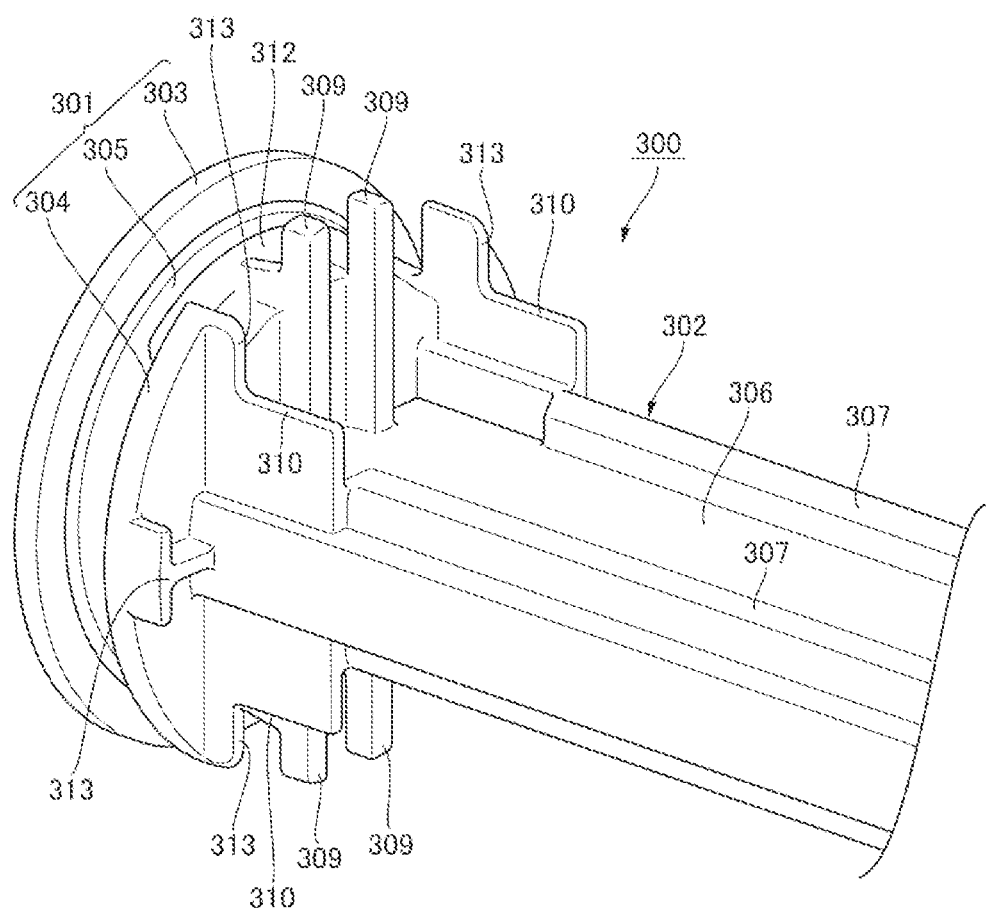
FIG. 3 is a partially enlarged perspective view of a piston rod of the air damper.

Referring also to FIG. 3, a cutout recess portion 312 is formed in the annular groove 305, and when the seal ring 311 moves to the first flange 303 side, the entire space between the inner periphery of the cylinder 200 and the outer periphery of the piston 301 is sealed, and when the seal ring 311 moves to the second flange 304 side, a gap is formed at the cutout recess portion 312, such that air in the cylinder 200 leaks. A columnar portion 309 for preventing the seal ring 311 from coming off is formed in the cutout recess portion 312.

The rod 302 includes a plate portion 306 extending from a back surface side of the second flange 304 of the piston 301, a pair of parallel reinforcing ribs 307 formed on both surfaces of the plate portion 306, and an attachment hole 308 formed in a protruding side end portion of the plate portion 306. The attachment hole 308 is used for attachment to the other side of the opening and closing member such as a glove box. In this case, the attachment hole 308 is attached so as to be rotatable about an axis of the attachment hole 308.

A plurality of stopper portions 313 are formed on a surface of the second flange 304 opposite to the annular groove 305. When the piston rod 300 is pulled out to the maximum extent, the stopper portions 313 come into contact with an end surface 413 on a protruding side of a cylindrical portion 410 of the cap 400 shown in FIG. 4, and regulate further pulling out of the piston rod 300.

Further, on both sides of the columnar portion 309, ribs are formed by further increasing a diameter of a connection portion between the reinforcing rib 307 and the second flange 304 in two stages so as to protrude, and the diameter-increased portion provided continuously with the second flange 304 constitutes a part of the stopper portion 313. Further, the lower diameter-increased portion slightly away from the second flange 304 is disposed inside an engagement claw 408 of the cap 400, which will be described later, and forms the deflection regulating portion 310 that prevents inward deflection of the engagement claw 408. In this embodiment, the deflection regulating portion 310 is formed by four ribs protruding parallel to each other at predetermined intervals on both surfaces of the plate portion 306.

Figure 4:
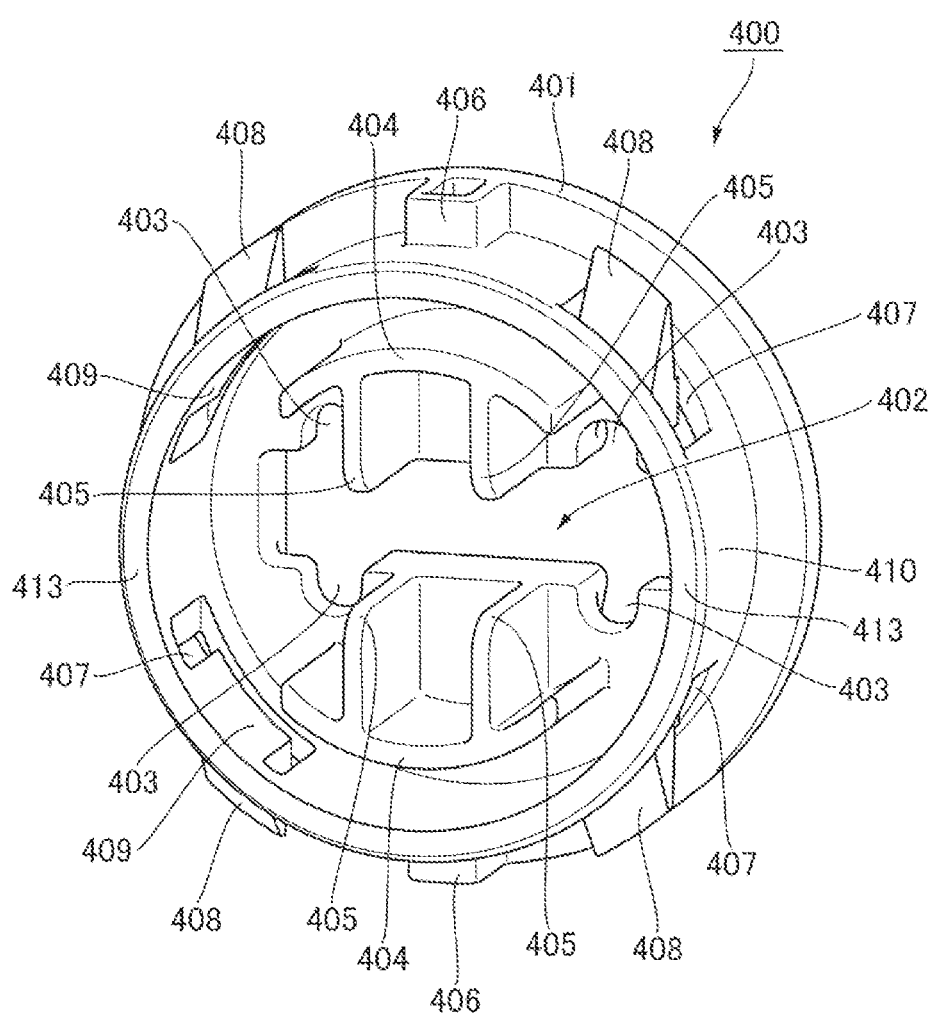
FIG. 4 is a perspective view of a cap of the air damper as viewed from a back surface side.

Referring also to FIGS. 1 and 4, the cap 400 includes an end plate 401 that closes the opening end portion 203 of the cylinder 200. An insertion hole 402 through which the rod 302 of the piston rod 300 is inserted and extracted is provided in a central portion of the end plate 401. The insertion hole 402 has an elongated slit shape as a whole, and has diameter-increased hole portions 403 extending in the vicinity of both end portions of the insertion hole 402 so as to intersect with each other. The diameter-increased hole portions 403 are portions through which the reinforcing rib 307 of the rod 302 passes. On an inner surface side of the end plate 401, a pair of arc-shaped ribs 404 disposed so as to face each other with the insertion hole 402 interposed therebetween, and a pair of parallel guide ribs 405 extending from an inner side of each arc-shaped rib 404 toward the insertion hole 402 are provided. The guide ribs 405 are in contact with both surfaces of the plate portion 306 and contribute to guiding the slide of the rod 302.

For the same purpose, on a front surface side of the end plate 401, a pair of guide pieces 411, which are erected along a longitudinal direction of the insertion hole 402 and disposed so as to face each other with the insertion hole 402 interposed therebetween, and a pair of guide pieces 412, which are erected on both end portions in the longitudinal direction of the insertion hole 402 and similarly disposed so as to face each other with the insertion hole 402 interposed therebetween, are provided. The guide pieces 411 and 412 also contribute to guiding the slide of the rod 302.

Further, the cylindrical portion 410 having an outer diameter adapted to an inner periphery of the cylinder 200 is formed on the inner surface side of the end plate 401. When the rod 302 of the piston rod 300 is pulled out, the stopper portion 313 of the piston rod 300 comes into contact with the end surface 413 of the cylindrical portion 410, and further pulling out of the rod 302 is regulated. The engagement claws 408 that are deflectable via slits 407 are formed at a plurality of positions in a peripheral direction of the cylindrical portion 410, that is, at four positions in this embodiment. The engagement claw 408 has a tapered surface whose thickness gradually increases toward a base portion side in an insertion direction into the cylinder 200, and a back surface side thereof is engaged with the engagement hole 204 of the cylinder 200 such that the cap 400 is prevented from coming off. Further, a protrusion portion 406 is formed at a portion of the cylindrical portion 410 facing in the radial direction, and the protrusion portion 406 is fitted into the cutout portion 205 of the cylinder 200 to position the cap 400 in a rotation direction. Then, by fitting the protrusion portion 406 into the cutout portion 205, the engagement claw 408 is aligned and engaged with the engagement hole 204.

Figure 5:
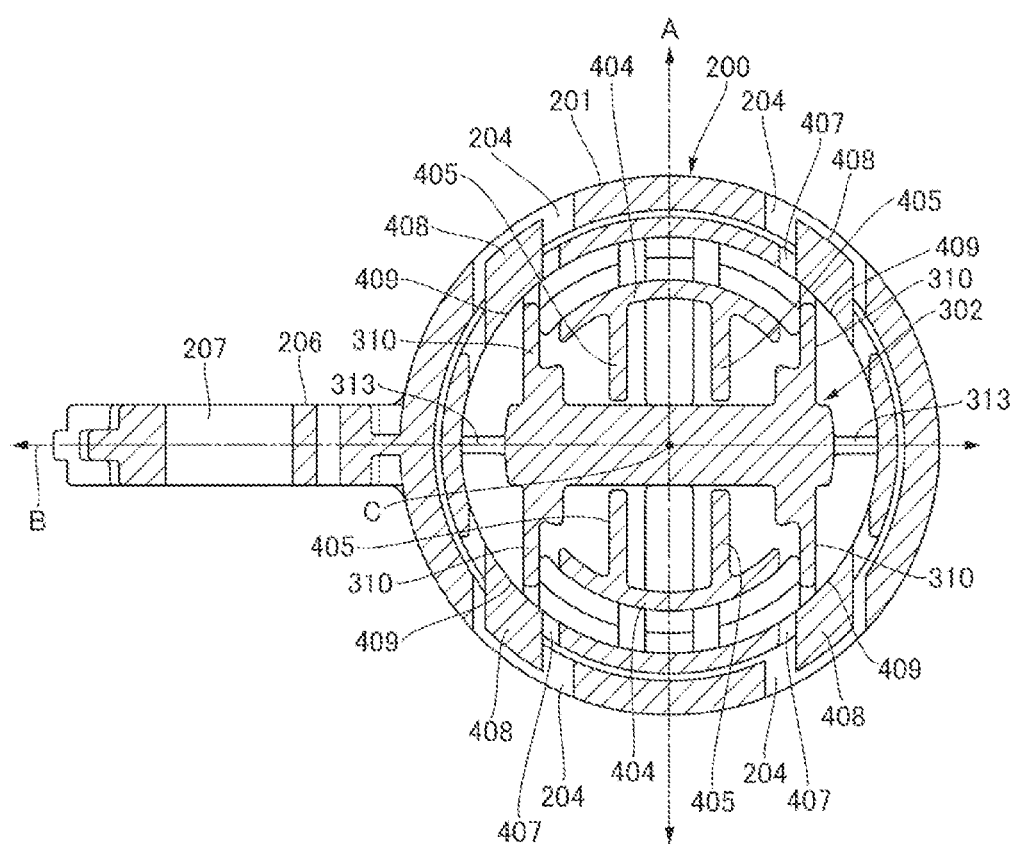
FIG. 5 is a cross-sectional view taken along an axial direction of a cylinder in a state in which the piston rod of the air damper is pulled out to a maximum extent, the cross-sectional view being cut at a portion to which the cap is attached.

By the way, the rod 302 is rotatably attached to the other side of the opening and closing member such as a glove box via the attachment hole 308. Referring also to FIG. 5, the rotation axis is in a direction of an arrow A in FIG. 5. Then, a back surface of the engagement claw 408 forms an inclined surface 409 inclined with respect to the rotation axis A when viewed in a direction of an axis C of the cylinder 200. Further, the inclined surface 409 is disposed so as to face the axial C side of the cylinder 200. Further, a plurality of, four in this embodiment, the inclined surfaces 409 are disposed so as to be line-symmetrical with respect to a line passing through the rotation axis A and a line B orthogonal to the rotation axis A and passing through the axis C of the cylinder 200. Then, front end portions of the deflection regulating portions 310 of the piston rod 300 are respectively disposed in the vicinity of the inclined surfaces 409 on the inner sides of the engagement claws 408. In this embodiment, the inclined surface 409 serves as a contact surface of the present invention. The inclined surface 409 may be a flat surface or a concave curved surface as long as the inclined surface 409 is inclined with respect to the rotation axis A. Further, the contact surface formed on the back surface of the engagement claw 408 is not limited to the inclined surface 409 as described above, may have any shape as long as the deflection regulating portion 310 can come into contact with the contact surface when the rod 302 swings, and may be, for example, a surface having an L-shaped cross section formed by a surface perpendicular to the rotation axis A and a surface perpendicular to the line B.

Next, an operation of the air damper 100 will be described.

The air damper 100 is attached to an opening and closing member such as a glove box, and is used to apply a braking force to the opening and closing member when the opening and closing member is opened, for example. In this case, the bracket 206 of the cylinder 200 is rotatably attached to one side of the opening and closing member via the attachment hole 207, and the end portion on the protruding side of the rod 302 of the piston rod 300 is rotatably attached to the other side of the opening and closing member via the attachment hole 308.

Then, when the opening and closing member is opened, the rod 302 is pulled out from the cylinder 200, and the piston 301 slides in the cylinder 200 toward the cap 400. At this time, the seal ring 311 moves to an inner surface side of the first flange 303 (see FIG. 3), and hermetically seals a space between the outer periphery of the piston 301 and the inner periphery of the cylinder 200, and therefore, the inside of the cylinder 200 becomes a negative pressure, and a braking force is applied. On the other hand, when the opening and closing member is closed, the rod 302 is pushed into the cylinder 200, and the piston 301 moves to the closing end portion 202 side. At this time, the seal ring 311 moves to the second flange 304 side, and a gap is formed by the cutout recess portion 312, and therefore, air in the cylinder 200 flows out through the gap, and the braking force is released. Therefore, since the opening and closing member is slowly opened when being opened, it is possible to prevent the opening and closing member from being vigorously opened to scatter the content, and it is possible to quickly close the opening and closing member when being closed.

On the other hand, for maintenance, repair, and the like of the vehicle, it may be necessary to remove the opening and closing member such as a glove box or to open the opening and closing member largely. In such a case, it may be necessary to remove the air damper 100 and the like attached to the opening and closing member or to largely pull out the rod 302, and the rod 302 of the piston rod 300 may largely swing with respect to the cylinder 200 in accordance with such an operation.

Figure 6:
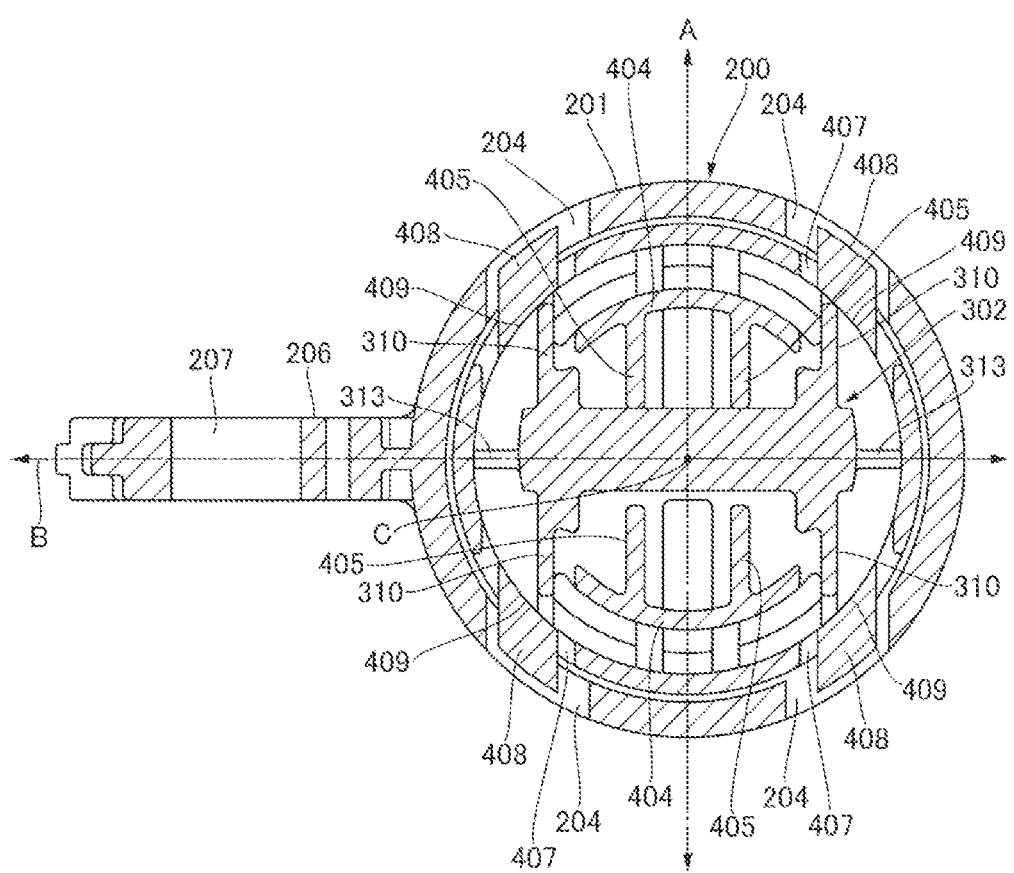
FIG. 6 is a cross-sectional view taken along the axial direction of the cylinder when the piston rod of the air damper swings in a predetermined direction, the cross-sectional view being cut at a portion to which the cap is attached.
Figure 7:
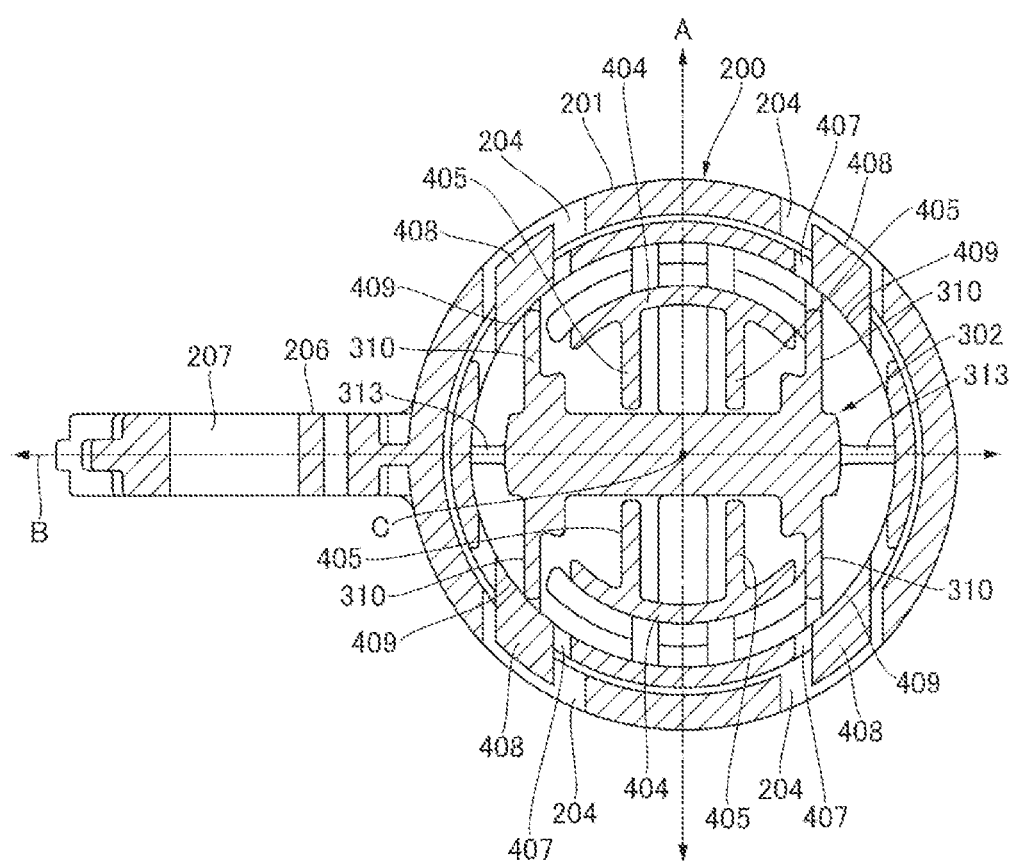
FIG. 7 is a cross-sectional view taken along the axial direction of the cylinder when the piston rod of the air damper swings in a direction different from that of FIG. 6, the cross-sectional view being cut at a portion to which the cap is attached.

However, according to the air damper 100, as shown in FIG. 6, when the rod 302 swings, for example, in the direction of the rotation axis A, the deflection regulating portion 310 comes into contact with the inclined surface 409 of the engagement claw 408 positioned on the upper side or the lower side in FIG. 6 (the upper side in the example of FIG. 6), and it is possible to prevent the engagement claw 408 from coming off the engagement hole 204 of the cylinder 200. Further, as shown in FIG. 7, when the rod 302 swings, for example, in a direction B perpendicular to the rotation axis A, the deflection regulating portion 310 comes into contact with the inclined surface 409 of the engagement claw 408 positioned on the left side or the right side in FIG. 7 (the left side in the example of FIG. 7), and it is possible to prevent the engagement claw 408 from coming off the engagement hole 204 of the cylinder 200. When the rod 302 swings obliquely, the deflection regulating portion 310 positioned in that direction comes into contact with the back surface of the engagement claw 408 positioned in that direction, and it is possible to prevent the engagement claw 408 from coming off the engagement hole 204 of the cylinder 200. Accordingly, regardless of the direction in which the rod 302 swings, the deflection regulating portion 310 comes into contact with the inclined surface 409 on the inner surface side of the engagement claw 408, and the engagement claw 408 is prevented from coming off the engagement hole 204, and therefore, it is possible to effectively prevent the cap 400 from coming off the cylinder 200.

Further, as shown in FIGS. 5 to 7, in this embodiment, four or more, four in this embodiment, the engagement claws 408 are formed so as to be line-symmetrical with respect to the line passing through the rotation axis A and the line B orthogonal to the rotation axis A when viewed in the direction of the axis C of the cylinder 200. Therefore, regardless of the direction in which the rod 302 swings with respect to the cylinder 200, the deflection regulating portion 310 prevents the engagement claws 408 from coming off in a well-balanced manner, and the cap 400 can be more effectively prevented from coming off the cylinder 200.

Further, as shown in FIGS. 5 to 7, in this embodiment, the inclined surface 409 on the inner surface side of the engagement claw 408 is formed so as to face the axial C side when viewed in the direction of the axial C of the cylinder 200. Therefore, when the rod 302 swings in the direction of the rotation axis A, the deflection regulating portions 310 come into contact with the inclined surfaces 409 of the two left and right engagement claws 408 disposed on the upper side or the lower side in FIG. 6 (the upper side in the example of FIG. 6), and the engagement claws 408 are pressed so as to be separated from each other in the left and right direction. Similarly, when the rod 302 swings in a direction along the line B orthogonal to the rotation axis A, the deflection regulating portions 310 come into contact with the two upper and lower engagement claws 408 disposed on the left side or the right side in FIG. 7 (the left side in the example of FIG. 7), and the engagement claws 408 are pressed so as to be separated from each other in the upper and lower direction. As a result, the effect of pushing the engagement claw 408 into the engagement hole 204 can be improved, and the cap 400 can be more effectively prevented from coming off the cylinder 200.

REFERENCE SIGNS LIST

100: air damper
200: cylinder
201: cylinder body
202: closing end portion
203: opening end portion
204: engagement hole
205: cutout portion
206: bracket
207: attachment hole
300: piston rod
301: piston
302: rod
308: attachment hole
309: columnar portion
310: deflection regulating portion
311: seal ring
313: stopper portion
400: cap
402: insertion hole
408: engagement claw
409: inclined surface

The invention claimed is:

1. An air damper, comprising:
a cylinder having one end closed and another end opened;
a piston member which includes a piston inserted into the cylinder and a rod connected to the piston and protruding from an opening of the cylinder; and
a cap having an insertion hole for the rod and attached to the opening, wherein
a plurality of engagement holes are formed in an edge portion of the opening of the cylinder,
the cap is formed with an insertion portion which is inserted into the opening, and an engagement claw which protrudes outward from an outer surface of the insertion portion, which is deflectable and deformable with respect to the insertion portion, and which is inserted into the opening and is fitted into one of the engagement holes from an inner side of the one of the engagement holes,
the piston member includes a stopper portion configured to come into contact with the cap in a state that the rod is pulled out to a maximum extent, and a deflection regulating portion configured to be positioned inside the engagement claw in the state of being pulled out to the maximum extent and to regulate an inward deflection of the engagement claw,
an attachment portion configured to be rotatably attached to an attachment target portion is provided at an end portion of the rod that protrudes from the opening, and
a contact surface is formed on the inner side of the engagement claw when viewed in an axial direction of the cylinder, the contact surface being capable of coming into contact with the deflection regulating portion when the rod swings in a direction of a rotation axis of the attachment portion with respect to the attachment target portion or in a direction intersecting the rotation axis.

2. The air damper according to claim 1, wherein
the contact surface on the inner side of the engagement claw forms an inclined surface inclined with respect to the rotation axis of the attachment portion with respect to the attachment target portion when viewed in the axial direction of the cylinder.

3. The air damper according to claim 2, wherein
four or more of the contact surfaces on the inner side of the engagement claw are formed so as to be line-symmetric with respect to a line of the rotation axis of the attachment portion with respect to the attachment target portion and a line passing through an axis of the cylinder and orthogonal to the rotation axis when viewed in the axial direction of the cylinder.

4. The air damper according to claim 2, wherein
the contact surface on the inner side of the engagement claw is formed so as to face an axial side of the cylinder when viewed in the axial direction of the cylinder.

* * * * *